United States Patent [19]

Clark et al.

[11] Patent Number: 5,611,292

[45] Date of Patent: Mar. 18, 1997

[54] SEED FIRMING WHEEL ASSEMBLY WITH BEARING CAP

[75] Inventors: Stanley R. Clark, Hesston; Michael J. Dresher, Canton, both of Kans.

[73] Assignee: Great Plains Manufacturing, Incorporated, Assaria, Kans.

[21] Appl. No.: 503,093

[22] Filed: Jul. 17, 1995

[51] Int. Cl.⁶ .............................. B60B 27/02; A01C 5/06
[52] U.S. Cl. ........................ 111/189; 384/480; 384/488; 384/489; 301/37.1
[58] Field of Search ............................ 111/189; 304/460, 304/489, 488, 480; 301/37.1, 32.37, 108.1, 108.4

[56] References Cited

U.S. PATENT DOCUMENTS

| 1,680,741 | 8/1928 | Lang | 384/489 |
|---|---|---|---|
| 2,539,866 | 1/1951 | Schill | 384/460 |
| 2,849,261 | 8/1958 | Bjerne | 384/460 |
| 2,879,114 | 3/1959 | Bowen | 384/489 |
| 2,988,408 | 6/1961 | DeLuca | 384/480 |
| 3,397,933 | 8/1968 | Hatcher | 384/460 |
| 5,398,625 | 3/1995 | Johnson et al. | 111/189 |
| 5,494,339 | 2/1996 | Johnson et al. | 301/37.1 |

*Primary Examiner*—Terry Lee Melius
*Assistant Examiner*—Christopher J. Novosad
*Attorney, Agent, or Firm*—Hovey, Williams, Timmons & Collins

[57] ABSTRACT

A stationary, formed metal cap covers the bearing assembly of the rotatable firming wheel to protect the bearings against the ingress of mud, residue and moisture. A smooth, convex, exposed outer surface on the cap discourages the accumulation of residue and mud between the rotating wheel and its stationary support arm so as to keep the wheel freely rotating during its rolling movement in the seed trench. A flat, band-like, circular edge around the periphery of the convex surface is received within a circular groove on the face of the wheel to obstruct the ingress of moisture and materials at that location and disposes the marginal periphery of the convex surface in a substantially flush condition with the surface of the wheel to prevent wrapping and accumulation of trash.

14 Claims, 8 Drawing Sheets

SEED FIRMING WHEEL ASSEMBLY WITH BEARING CAP

TECHNICAL FIELD

This invention relates to planting equipment such as grain drills and corn planters. More particularly, it relates to a seed firming wheel assembly for such equipment, of the type described and claimed in U.S. Pat. No. 5,398,625.

BACKGROUND

After seeds have been deposited in a trench formed by a pair of opener discs, it is desirable to press the seeds gently down into the soil at the bottom of the trench before the trench is then covered over with soil by the trailing press wheel. A variety of small firming wheels have heretofore been provided by various manufacturers for accomplishing this function.

However, one nagging problem is the accumulation of trash residue and mud in and around the firming wheels. When the buildup of this type of material becomes great enough, it will actually interfere with the rolling action of the wheel and may cause it to stop rolling all together, turning the wheel into more of a gouging device than something that gives the seed its final setting into place. The residue, mud and moisture can also cause premature failure of the bearing assembly of the wheel.

SUMMARY OF THE INVENTION

Accordingly, one important object of the present invention is to provide a way of preventing mud and trash build-up on a firming wheel of the type disclosed in the '625 Patent and of protecting the bearing assembly of the wheel against the hostile environment.

In carrying out this and other important objects of the invention, it is contemplated that the firming wheel will be provided with a special protective cap that overlies the bearing assembly and has a convex outer surface tending to shed mud, moisture and trash that might otherwise accumulate in the region. The cap is designed to reside between the mounting arm of the unit and the rotating wheel itself while remaining stationary during rolling movement of the wheel through the seed trench. A downturned circular edge on the cap slips into a circular receiving groove in the face of the wheel to inhibit the ingress of moisture and other materials. Preferably, the downturned edge projects far enough into the groove that the peripheral extremity of the convex portion of the cap lies substantially flush with the surface of the wheel. Specially designed retaining structure holds the cap against rotation with the wheel but permits the cap to be selectively adjusted 180° out of its original position when the lower half of the cap becomes excessively worn and unusable.

Various other objects and advantages, and features of novelty which characterize the invention are pointed out with particularity in the claims, annexed hereto and forming a part hereof. However, for a better understanding of the invention and its advantages obtained by its use, reference should be had to the Drawings which form a further part hereof and to the accompanying descriptive matter in which there are illustrated and described several embodiments of the invention.

DETAILED DESCRIPTION

Figure 1:
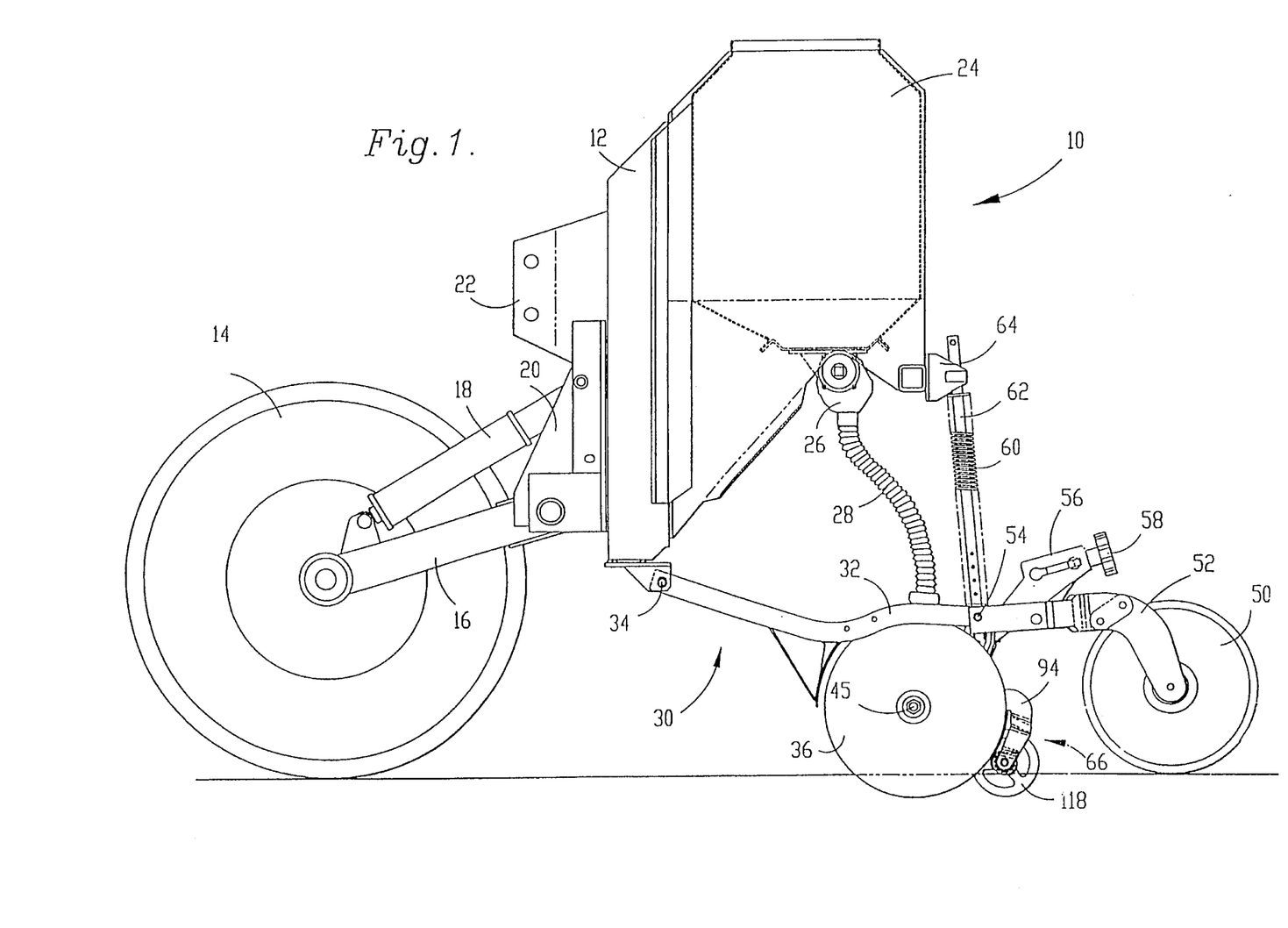
FIG. 1 is a side elevational view of a grain drill employing a double disc opener having a seed firming wheel assembly associated therewith in accordance with the principles of the present invention.

The grain drill 10 illustrated in FIG. 1 may take a variety of different forms within the scope of the present invention. For the sake of illustration, the drill 10 comprises a "Solid Stand 3-point Drill" commercialized by the assignee of the present invention and disclosed in somewhat more detail as part of a folding drill in U.S. Pat. No. 4,664,202. The '202 patent is hereby incorporated by reference into the present application as may be necessary for a full and complete understanding of the present invention.

The drill 10 includes a main transverse frame 12 which is partially supported by ground wheels 14 (only one being shown) located in front of the frame 12 and height-controlled by a vertically swingable mounting arm 16 and an extendible and retractable link 18. The arm 16 is swingably connected to the front of the frame 12 while the link 18 extends between the front end of the arm 16 and the frame 12. A pair of lower 3-point mounting brackets 20 spaced along the front of the frame 12 (only one of such brackets 20 being illustrated) and a third, upper bracket 22 located centrally between the two lower brackets 20 comprise 3-point mounting structure for attaching the drill 10 to either the 3-point hitch of a towing tractor or of a suitable pull-type frame. A seed box 24 carried by the frame 12 delivers a steady supply of seeds toward the ground through a metering cup 26 and a flexible hose 28 leading from the metering cup 26.

The drill 10 also includes a plurality of opener units 30 (only one being shown) secured to the frame 12 at spaced locations across the width of the machine according to the desired row spacing. Each of the openers 30 includes a generally fore-and-aft extending sub-frame 32 swingably mounted at its front end to the frame 12 via a transverse pivot 34. Near the fore-and-aft midpoint of each sub-frame 32, the sub-frame is provided with a pair of side-by-side, downwardly and forwardly converging opener discs 36 and 38 that penetrate the soft to a certain depth as the drill is advanced and thus form a generally V-shaped trench or seed groove in the soft. A slightly forwardly inclined mounting bar 40 (FIGS. 2, 5, and 6) projects down from sub-frame 32 on the fore-and-aft centerline of the opener unit and supports the discs 36,38 for rotation about slightly downwardly and forwardly projecting axes of rotation. The bar 40 has a pair of nuts 44 welded to opposite sides thereof at slightly downwardly and forwardly inclined angles for receiving respective mounting bolts 45 of the discs 36,38, each of the latter having its own bearing assembly journaled on the corresponding bolt 45.

Figure 2:
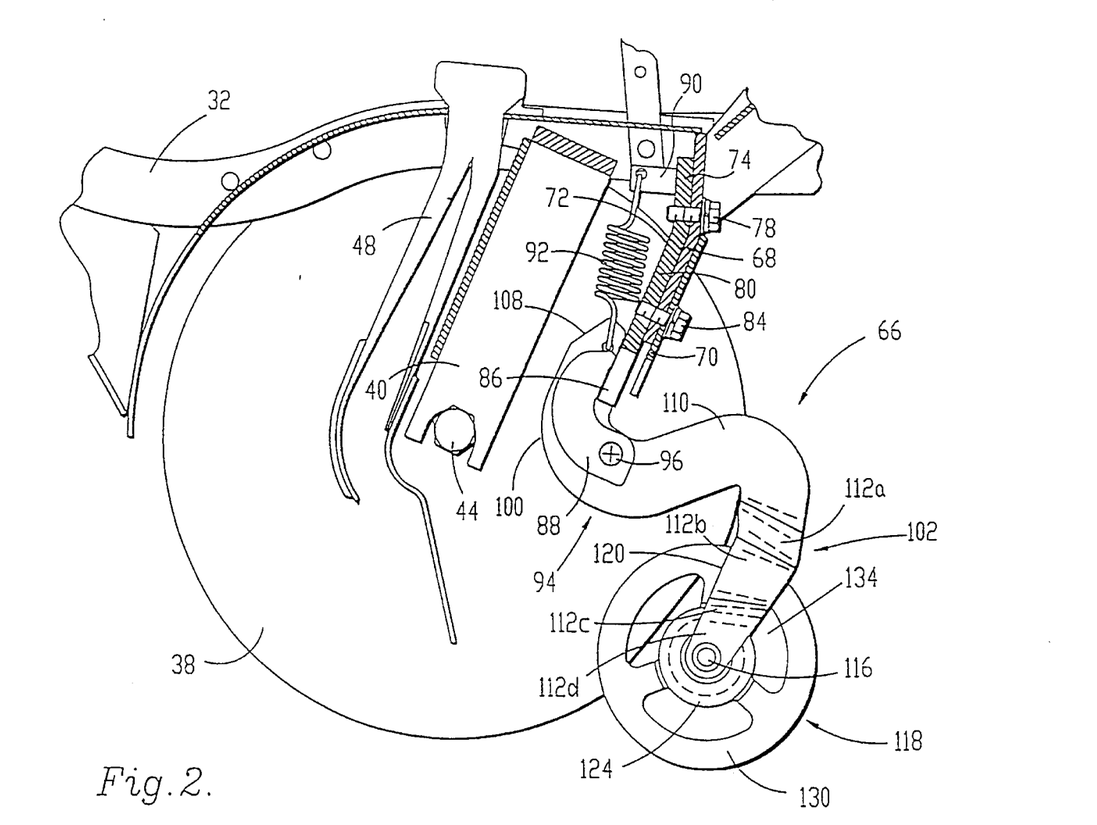
FIG. 2 is an enlarged, fragmentary elevational view thereof with the near disc removed to reveal internal details of construction, certain parts being shown in cross-section for clarity.
Figure 3:
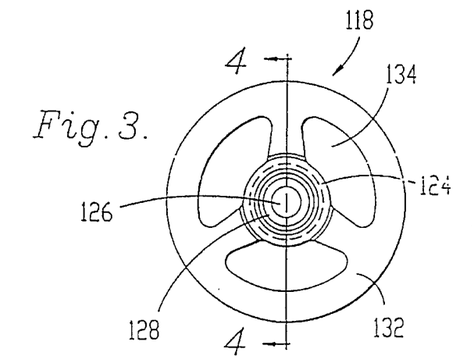
FIG. 3 is a side elevational view of one embodiment of a seed firming wheel in accordance with the principles of the present invention.
Figure 4:
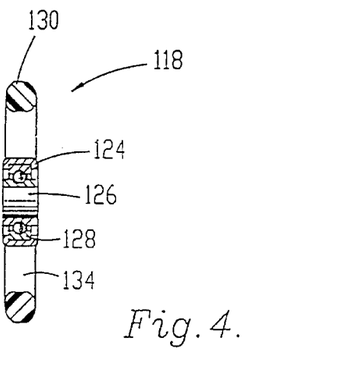
FIG. 4 is a vertical cross-sectional view through the firming wheel embodiment of FIG. 3.

As illustrated in FIG. 2, a seed drop tube 48 is carried by each sub-frame 32 and depends therefrom into the space between the forwardly converging discs 36,38 slightly ahead of the pivot shafts 44,46, although the lowermost discharge end 48a of the tube 48 is disposed below the pivot shafts 44,46 and substantially in fore-and-aft alignment therewith such that seeds gravitating from the drop tube 48 fall into the trench immediately after its preparation by the converging discs 36,38.

Figure 5:
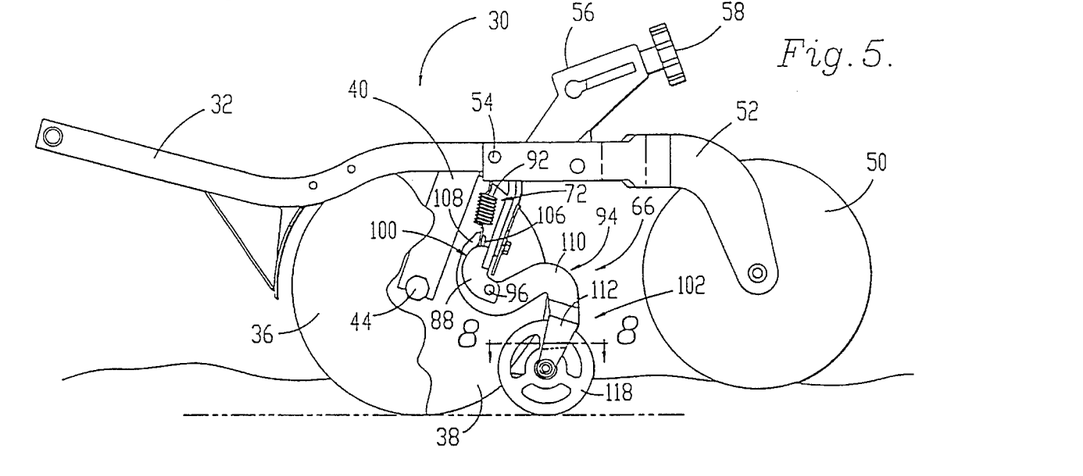
FIG. 5 is a side elevational view of the double disc opener in use with the near disc partially broken away to reveal the firming seed wheel assembly between the discs.

As shown in FIGS. 1 and 5, the depth of penetration of the discs 36,38 is controlled and regulated by one or more press wheels 50 adjustably secured to the rear end of the sub-frame 32. As well understood by those skilled in the art, the press wheel 50, which may be of a variety of configurations, is mounted on a generally fore-and-aft extending lever arm 52 pivotally coupled at its front end with the sub-frame 32 via a transverse pivot 54. The lever arm 52 is held in a selected vertical position about the pivot 54 by control mechanism 56 which operably interconnects the sub-frame 32 and the lever arm 52. A hand knob 58 of the control mechanism 56 allows the operator to adjust the position at which the lever arm 52 and the press wheel 50 are held relative to the discs 36,38. Down pressure for the discs 36,38 is provided by one or more compression springs 60 coiled about an upright guide rod 62 and trapped between the sub-frame 32 and a shoulder 64 fixed to the rear of the frame 12 behind the seed box 24.

In accordance with the present invention, the opener 30 is provided with a seed firming wheel assembly broadly denoted by the numeral 66 and situated generally between the press wheel 50 and the rear of the discs 36,38. As illustrated in FIG. 2, the sub-frame 32 has a rigid, generally upright strap 68 fixed thereto and depending therefrom which serves as a convenient mounting means for the assembly 66. The strap 68 also serves as a convenient means for supporting a blade-type scraper 70 between the upper rear portions of the discs 36,38 for scraping away mud and other materials that might tend to accumulate between the discs in that area.

Figure 7:
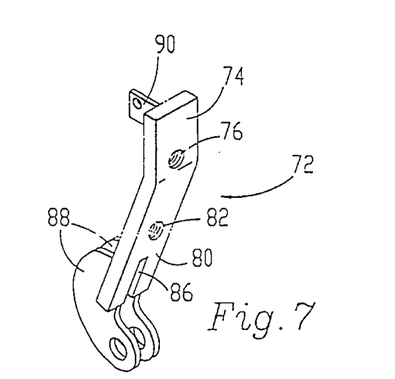
FIG. 7 is a perspective view of a mounting bracket of the firming wheel assembly.

The strap 68 is slightly angled forwardly and carries along its front side a complementally angled mounting bracket 72 of the wheel assembly 66. The bracket 72 is shown in an isolated condition in FIG. 7, and reference may be made to that figure if need be for a full understanding of the nature and configuration of the bracket 72.

It will be noted that the bracket 72 includes an upper, relatively short leg 74 having a threaded mounting hole 76 (FIG. 7) that receives a threaded fastener 78 which secures the leg 74 to the adjacent portion of the strap 68. Likewise, a lower, longer leg 80 of the bracket 72 has a transverse threaded hole 82 which receives a second threaded fastener 84 passing through both the strap 68 and the scraper 70. The lowermost end of the leg 80 has an upwardly extending trash clearance notch 86, as well as a pair of generally kidney-shaped mounting ears 88 that are rigidly fixed to the front face of the leg 80 on opposite sides of the clearance notch 86 and which project downwardly beyond the lowermost extremity of the leg 80. A rigid tab 90 projects forwardly from the upper leg 74 to serve as an attaching point for a tension spring 92 which yieldably biases the wheel assembly 66 toward a lowered position in a manner yet to be described.

Figure 11:
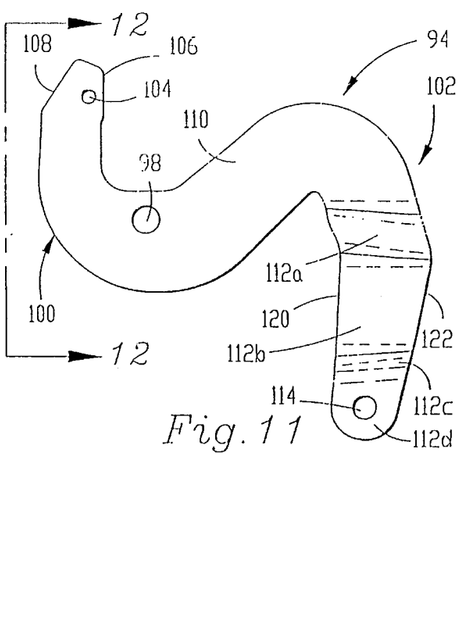
FIG. 11 is a side elevational view of the swingable mounting arm for the firming wheel.
Figure 12:
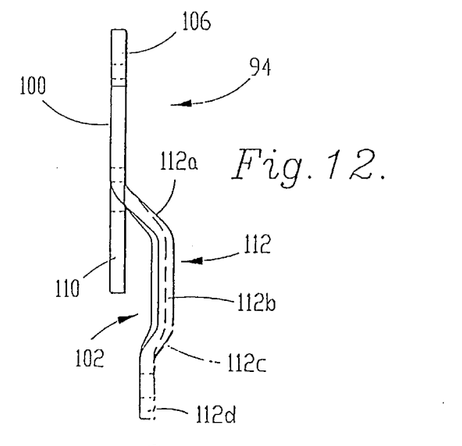
FIG. 12 is an end elevational view of the swing arm of FIG. 11 taken substantially along sight line 12—12 thereof.

The firming wheel assembly 66 also includes a generally S-shaped mounting arm 94 which is pivotally mounted intermediate its ends between the two kidney-shaped ears 88 by a transverse pivot 96. As illustrated in FIGS. 11 and 12, the mounting arm 94 is formed from an initially flat piece of plate material so as to present a relatively thin profile, except in those areas in which the arm 94 is joggled outwardly as described hereinafter. A transverse hole 98 for the pivot 96 effectively divides the arm 94 into a front section generally denoted by the numeral 100 and a rear section likewise generally denoted by the numeral 102. The front section 100 is upturned and is provided with a small hole 104 adjacent its upper end which receives the lower end of the coil spring 92 such that the spring 92 yieldably biases the arm 94 in a clockwise direction viewing FIGS. 2, 5, 6, and 11. Along its inboard margin, the front section 100 has a stop edge 106 which is disposed to abut the proximal front face of the bracket 72 when the mounting arm 94 is in the position of FIGS. 2 and 5 whereby to limit the clockwise rotation of the arm 94. A somewhat similar although inclined stop edge 108 on the outboard margin of the front section 100 of arm 94 is disposed to abut the proximal disc mounting bar 40 when the arm 94 is rotated to the position illustrated in FIG. 6. Thus, it will be seen that the arm 94 is adapted to rotate through an arc of approximately 30°, limited at its opposite extremes by the bracket 72 and the disc mounting bar 40.

The rear section 102 of the mounting arm 94 has an upswept length 110 immediately behind the pivot 96 and hole 98 followed by a downturned length 112 which is joggled out in a lateral direction relative to the plane of the upswept length 110 and the front section 100. As illustrated in FIG. 2, the upswept length 110 is just long enough to reach the rear periphery of the discs 36,38, at which point the downturned length 112 begins and extends immediately to the rear of the rear periphery of the discs 36,38. It will be seen that when the arm 94 is in the lower position of FIGS. 1, 2, and 5, the forward edge of the downturned length 112 generally conforms to and is in close proximity with the rear arcuate periphery of the discs 36,38 so as to limit the opportunity for trash materials to become trapped between the rear of the discs 36,38 and the downturned length 112 of the arm 94.

As illustrated in particular in FIG. 12, the joggled out downturned length 112 includes an initial outturned segment 112a, an intermediate parallel segment 112b which is parallel to the upswept length 110 and the front section 100, an inturned, return segment 112c approximately half the length of the outturned segment 112a, and a final tip portion 112d which lies in a plane parallel to the upswept length 110 and the intermediate segment 112b. The tip portion 112d is provided with an opening 114 which serves to mount a transverse stub axle shaft 116 associated with a firming wheel 118 of the assembly 66.

It will be understood that the wheel 118 is ideally disposed on an imaginary, fore-and-aft centerline passing between the discs 36,38 such that the wheel 118 rides within the trench formed by the discs 36,38 during use. Such strategic positioning of the wheel 118 is achieved by virtue of the joggled nature of the downturned length 112 of the rear section 110 of mounting arm 94. It will also be noted from FIGS. 1 and 2 in particular that the joggled downturned length 112 is positioned to the rear of the periphery of the discs 36,38 so as not to interfere with the free rotation of the two discs 36,38 themselves, notwithstanding the additional width inherent in the otherwise flat mounting arm 94 afforded by the joggled portion. It will also be noted that because of the intimate relationship between the downturned length 112 of the arm 94 and the rear periphery of the discs 36,38, the wheel 118 is close-coupled with the discs 36,38 and in fact has its forward half projecting into the space between the two discs.

It is to be noted that the parts of the firming wheel assembly 66 are so configured and arranged that when the stop edge 106 of arm 94 is against the bracket 72 as in FIGS. 1, 2, and 5, the wheel 118 projects a short distance down below the lowermost extremity of the discs 36,38. However, the coil spring 92 is so designed as to permit the wheel 118 to readily swing up out of its lowermost position in the event obstacles such as clods, stones, or trash materials are encountered. In fact, the spring force of spring 92 is selected so that, in use, the firming wheel 118 is incapable of bearing the weight of the opener 30 and serving as the depth gauging means in lieu of the press wheel 50. In one exemplary embodiment, a spring having a spring rate of 27.5 lbs. per inch with 8.8 active coils and a maximum extended length of 4-⅜ inches has been found to be effective. The initial tension of such spring is approximately 7.1 lbs.

Figure 8:
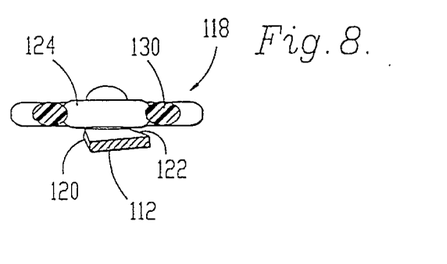
FIG. 8 is a slightly enlarged, transverse cross-sectional view of the firming wheel of FIG. 5 taken substantially along line 8—8 of that figure.

As shown best in FIGS. 8 and 12, the downturned length 112 of the arm 94 is twisted slightly out of a truly vertical plane, on the order of approximately 5°, (except for the tip 112d) so that its leading edge 120 is spaced slightly farther away from the proximal surface of the wheel 118 than the trailing edge 122. Thus, in effect, the downturned length 112 in portions 112a, 112b, and 112c thereof diverges outwardly away from the proximal surface of the wheel 118 in a forward direction with respect to the normal path of travel of the firming wheel assembly 66, such diverging relationship helping to release mud and trash materials that might otherwise become trapped between the downturned length 112 and the wheel 118.

The wheel 118 illustrated in FIGS. 1–8 represents one embodiment of a wheel usable in accordance with the present invention. Such wheel 118 is preferably molded from a synthetic resinous material such as Xenoy-6370 which is available from General Electric Company. A central, circular hub 124 of the wheel 118 has a concentric bore 126 therethrough which is defined by a molded-in bearing 128 journaled on the pivot 116 at the lower end of the arm 24. An outer rim 130 of the wheel 118 is joined with the hub 124 by three radially extending, circumferentially spaced apart spokes 132 disposed at 120° intervals about the periphery of the inner hub 124.

Figure 9:
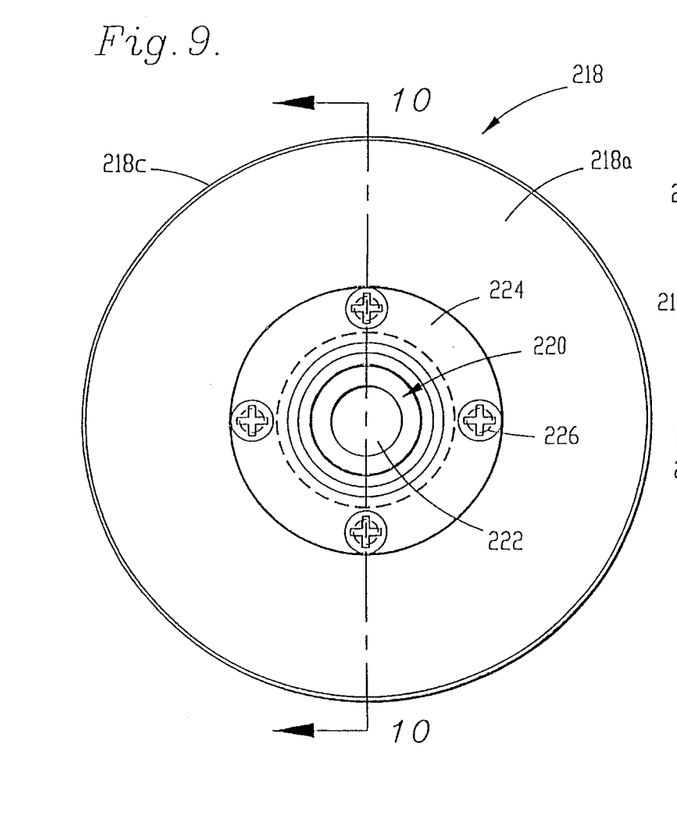
FIG. 9 is a side elevational view of a second embodiment of the firming wheel comprising a smooth, non-spoked wheel constructed of ultra-high-molecular-weight polyethylene.
Figure 10:
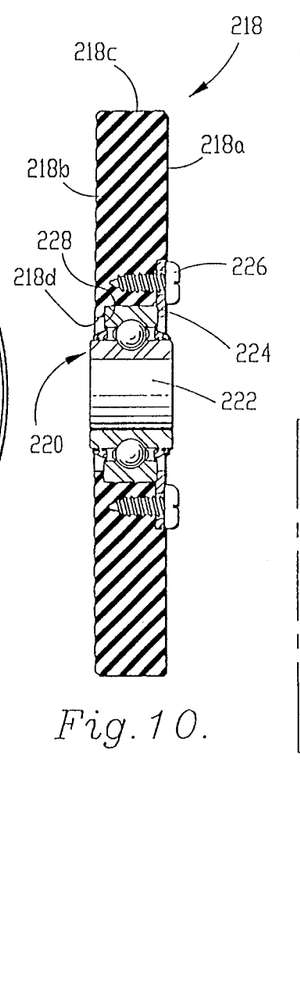
FIG. 10 is a vertical cross-sectional view of the smooth wheel taken substantially along line 10—10 of FIG. 9.

In some conditions, the open spaces 134 between the spokes 132 may tend to trap stalks and other materials during field use of the equipment, although the spaces 134 also permit the pass-through of soft and clods. Thus, a preferred form of the firming wheel, if accumulation of foreign material between the spokes 132 is a concern, is illustrated in FIGS. 9 and 10 and is denoted broadly by the numeral 218. It will be seen that the wheel 218 is constructed from a smooth circular block of synthetic resinous material and has no spokes or spaces between such spokes as part of its configuration. Instead, the opposite sides of the smooth wheel 218 simply comprise flat faces 218a and 218b which extend from the outermost periphery 218c to an inner circular periphery 218d, at which location a bearing assembly 220 is located. The bearing assembly has a centrally defined bore 222 therethrough which receives the pivot pin 116 of the wheel assembly 66. An annular retaining flange 224 is secured to the face 218a of the wheel 218 by a plurality of screws 226 to assure that the bearing assembly 220 remains seated against an internal shoulder 228 within the wheel 218. In its preferred form, the smooth wheel 218 is formed from an ultra-high-molecular-weight polymer (UHMW) which is selected because of its extremely high abrasion resistance, its exceptional impact resistance and its non-stick surface characteristics. Thus, the wheel 218 is relatively long wearing, yet resists the adherence and accumulation of mud and other materials to its various surfaces. One source of the product is the Poly Hi Company of Ft. Wayne, Ind., as ⅝ inch thick black static-reduced TIVAR-100 having a molecular weight of 4.5–5.67 million.

Figure 18:
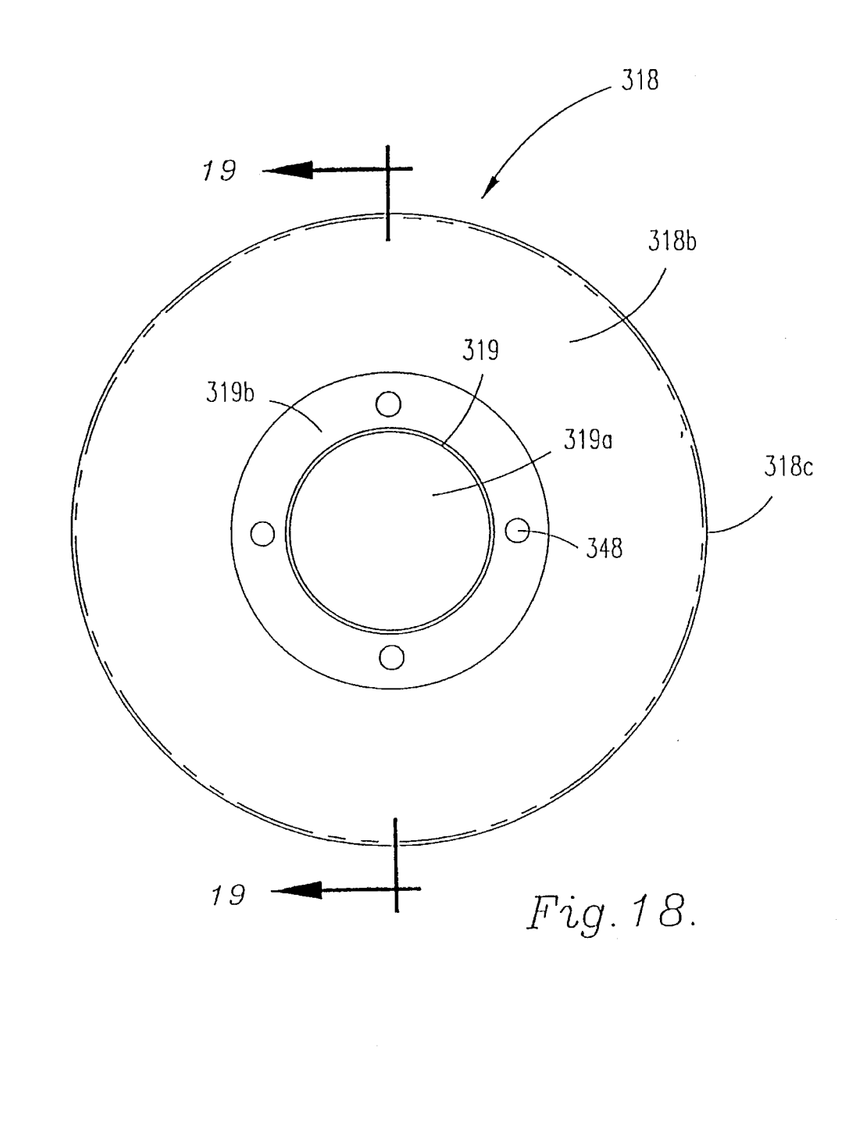
FIG. 18 is a side elevational view of the firming wheel shown in FIG. 13, illustrating the bore and counter-bore relationship.
Figure 19:
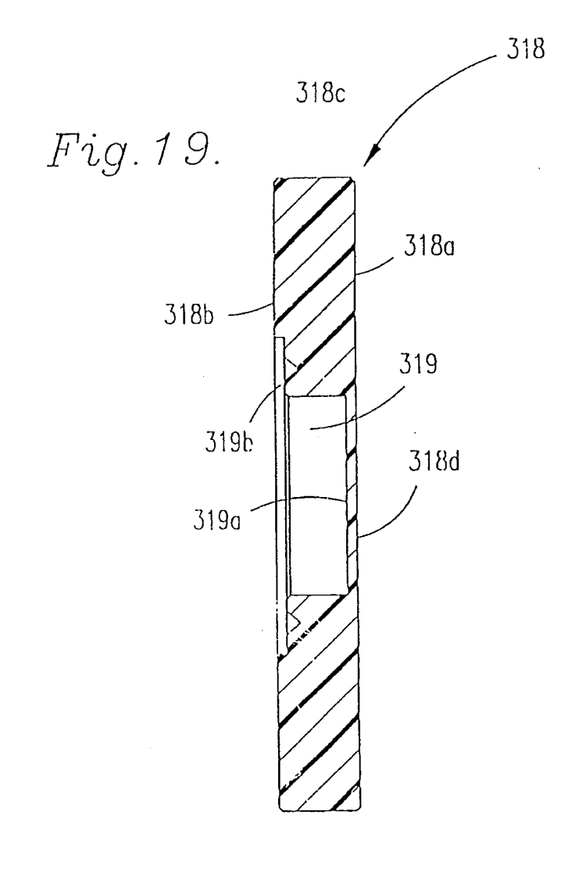
FIG. 19 is a vertical cross-sectional view of the firming wheel shown in FIG. 18 taken along the line 19—19 thereof.
Figures 25, 26, 27, 28:
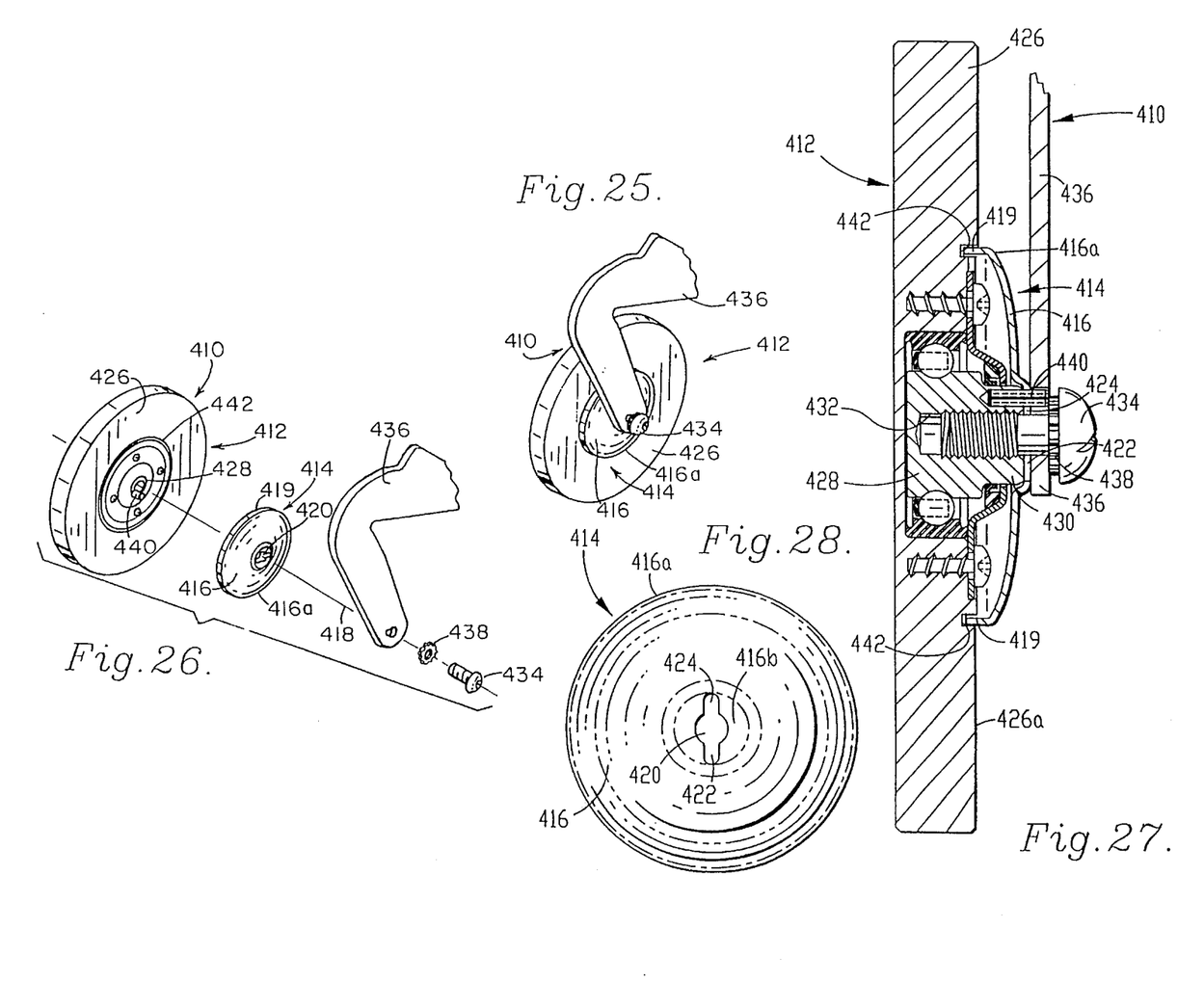
FIG. 25 is a fragmentary, right rear perspective view of the seed wheel of FIGS. 9–24 but provided with a protective cap in accordance with the present invention.
FIG. 26 is a fragmentary exploded view thereof.
FIG. 27 is a cross-sectional view through the capped wheel with the mounting arm illustrated fragmentarily.
FIG. 28 is a plan view of the cap itself.

Experience has shown that in operation, wheel bearing effectiveness can be adversely affected by the unacceptably high level of dirt, residue and trash entry through bearing seals into the bearing internal structure. Experience has also shown that high level of bearing seal drag can be experienced with conventional wheel-bearing design when used in wet soil conditions. Thus an alternative preferred form of the firming wheel, is illustrated in FIGS. 13 through 22 and is broadly denoted by the numeral 318. Wheel 318 is constructed from a smooth circular block of synthetic resinous material, such as UHMW (as previously described), and has no spokes or spaces such as spokes as part of its configuration. Instead, opposite sides of the smooth wheel 318 simply comprise a first flat face 318a and a second flat wheel coupling face 318b. Face 318a presents a smooth surface extending from the outermost periphery 318c to wheel center 318d. Wheel coupling face 318b includes a concentric bore 319 located thereon and extending partially through wheel 318 as shown in FIG. 19. Bore 319 presents a blind face 319a therein and is adapted to receive an alternative bearing assembly 320. A concentric counter-bore 319b is positioned radially outwardly from bore 319 on the second flat wheel coupling face 318b, as shown in FIGS. 18 and 19, and is shallower than concentric bore 319.

Bearing assembly 320 includes an inner race or spindle 322 and an outer race 324 with rolling elements 325 located therebetween to permit relative movement between inner and outer races 322, 324. As shown in FIGS. 13, 20, 21 and 22, races 322 and 324 present interior and exterior planar faces 322a, 324a, 322b and 324b, respectively.

Figures 13, 22:
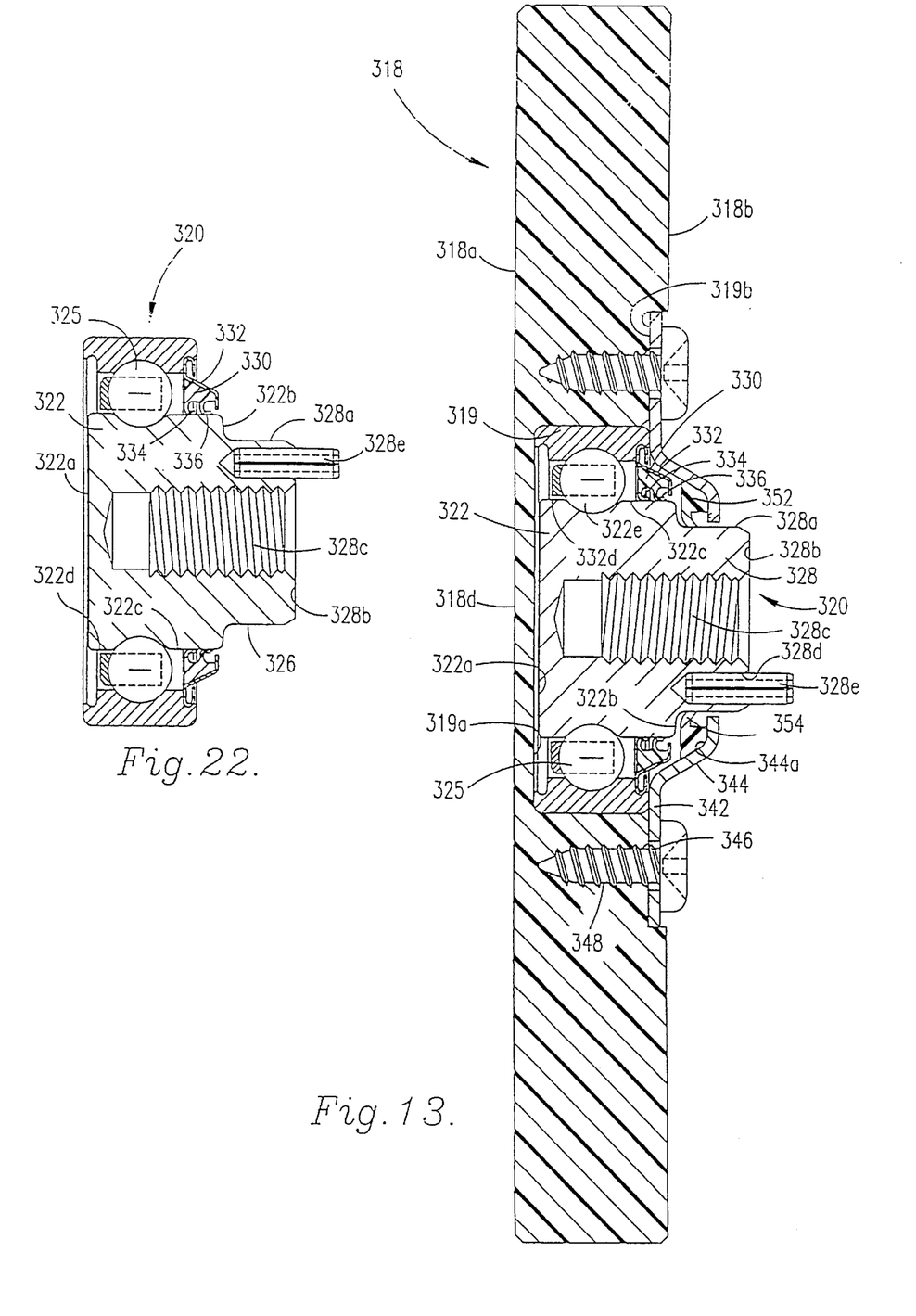
FIG. 13 is an enlarged, vertical cross-section view of the alternative firming wheel embodiment.
FIG. 22 is an enlarged, vertical cross-sectional view of the bearing assembly associated with the alternative wheel assembly shown in FIG. 13 showing the beating seal in relationship to the rolling elements.
Figures 14, 15, 16, 17, 20, 21, 23, 24:
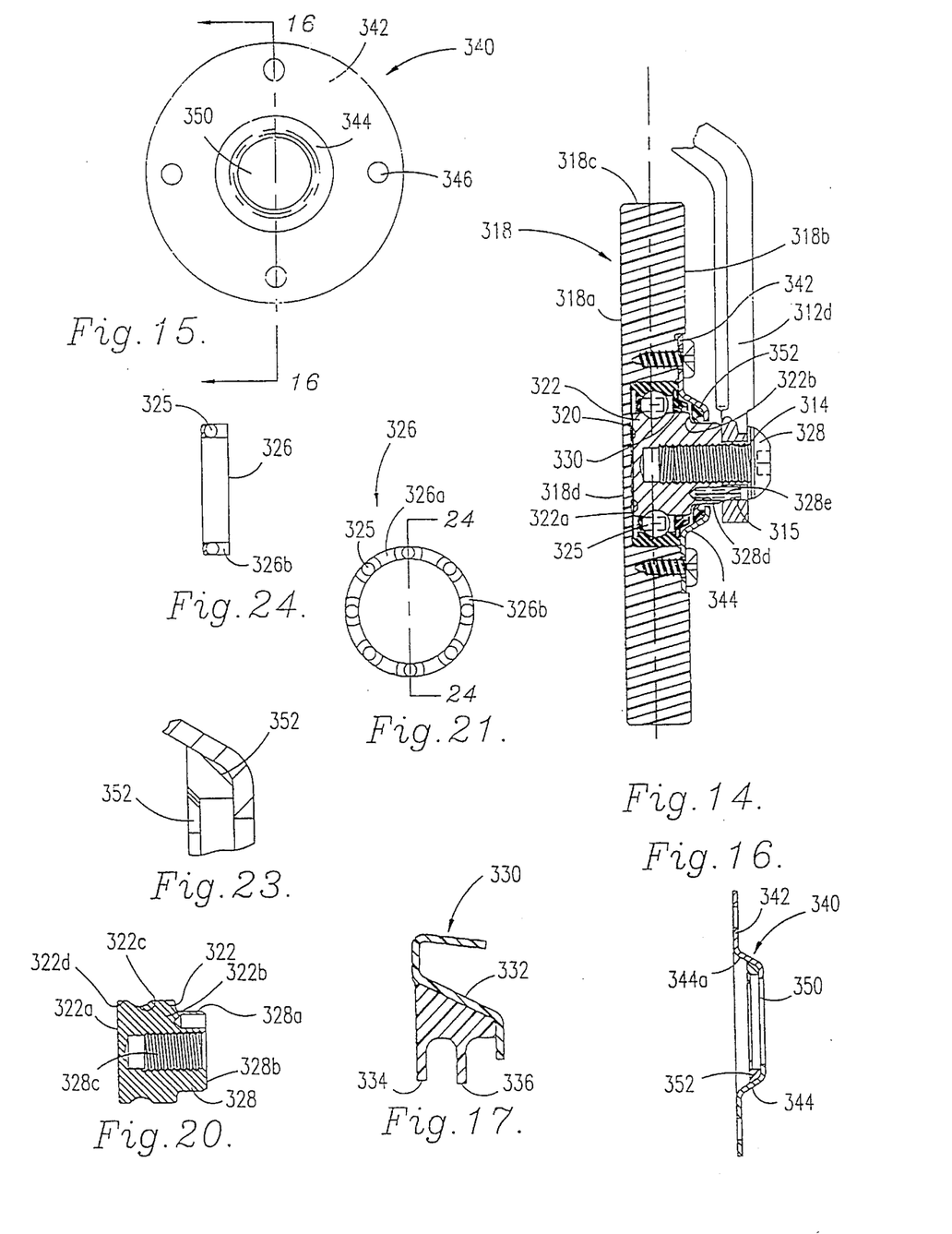
FIG. 14 is a reduced vertical cross-sectional view through the alternative firming wheel embodiment as coupled to the downturned length, shown fragmented, of the S-shaped mounting arm.
FIG. 15 is a side elevational view of the sealing shield used with the alternative wheel assembly shown in FIG. 13.
FIG. 16 is a vertical cross-sectional view through the sealing shield shown in FIG. 15 taken along the line 16—16.
FIG. 17 is an enlarged fragmentary, cross-sectional view of the bearing assembly seal as it appears before it is crimped into the bearing of the alternative wheel assembly shown in FIG. 13.
FIG. 20 is a vertical cross-sectional view through the inner race of the alternative wheel assembly shown in FIG. 13.
FIG. 21 is a side elevational view of the nylon ball retainer showing the spherical ball pockets.
FIG. 23 is an enlarged, cross-sectional fragmented view of the annular opening and bonded downwardly pending flexible lip seal associated with the sealing shield.
FIG. 24 is a vertical cross-sectional view through the nylon ball retainer ring of the alternative wheel assembly shown in FIG. 13 taken along the line 24—24 of FIG. 21.

As shown in FIG. 20, the spindle 322 includes first and second outer peripheral surfaces 322c and 322d effectively divided by spindle bearing surface 322e. As shown in FIGS. 13 and 22, outer race 324 includes first and second outer race annular surfaces 324c, 324d, effectively divided by an outer race bearing surface 324e.

A nylon ball retainer ring 326 is provided to maintain the spaced relationship between rolling elements 325, as shown in FIG. 21. Retainer ring 326 includes a plurality of roller dividing elements 326a with recessed roller pockets 326b located therebetween for receiving rolling elements 325.

As shown in FIG. 20, a shaft portion 328 is concentrically positioned on spindle exterior face 322b and extends outwardly therefrom. The diameter of shaft portion 328 is less than the diameter of spindle exterior face 322b. Shaft portion 328 includes a cylindrical outer surface 328a with opposite end 328b including a concentric threaded chamfer 328c and an off-center, roll-preventer pin bore 328d including a pin 328e securely inserted therein and extending outwardly therefrom, as shown in FIGS. 13, 14 and 20. Shaft opposite end 328b is adapted to fixedly attached to alternative tip portion 312d by means of a bolt 328f sized to extend through opening 314 and threadably engage threaded chamfer 328c. Alternative tip portion 312d is also provided with a small aperture 315, as shown in FIG. 14, to securely receive roll preventer pin 328e.

Concentric bore 319 is adapted to tightly receive bearing assembly 320 wherein spindle interior face 322a and outer race interior face 324a abut concentric bore blind face 319a.

As shown in FIGS. 13, 14, 17 and 22, a bearing seal is general referred to by the numeral 330 and includes an outer rim 332 fixedly attached to outer race first annular surface 324c. Bearing seal 330 further includes two continuous radially inwardly extending flexible lips 334, 336 depending from rim 332 and adapted to be in wiping engagement with spindle first outer peripheral surface 322c. In its preferred form, flexible lips 334, 336 are made of rubber-like material and obtained from Delta Rubber Company of Danielson, Conn.

As shown in FIGS. 15 and 16, a sealing shield 340 is provided for restricting the introduction of undesirable materials such as dirt, residue and trash into bearing assembly 320. Sealing shield 340, in the preferred embodiment, is formed by stamping sheet metal and includes a ting portion 342 and an annular region 344 extending therefrom. The ring portion 342 is provided with bolt holes 346, as shown in FIG. 15. The ring portion 342 is adapted to be piloted by and in registry with the concentric counter-bore 319b; thus, providing a snug fit so that a small, generally uniformly continuous clearance is provided between annular opening 350 and shaft cylindrical outer surface 328a. Counter-bore 319b further pilots ring portion 342 so that there is a substantially continuous wiping engagement between flexible lip 354 and outer cylindrical surface 328a. Wheel 318 is provided with threaded bolt holes 348 which correspond and are adapted to be in registry with sealing shield bolt holes 346. Ring portion 342 is adapted to be disposed against outer race 324 when bolted in concentric counter-bore 319b to secure bearing assembly 320 in concentric bore 319. Annular region 344 has an opening 350 for receiving shaft 328 therethrough. Opening 350 is sized so that there is a small clearance provided between opening 350 and shaft cylindrical outer surface 328a, as shown in FIGS. 13 and 22. A shield seal 352 is affixed to internal surface 344a and includes a continuous radially inwardly extending flexible lip 354 adapted to be in wiping engagement with said shaft outer cylindrical surface 328a to form a seal therewith. In the preferred embodiment, shield seal 352 is a rubber-like material which can be bonded to metallic surfaces and is a black nitrile buna "N" rubber, 60-70 durometer (hardness) shore "A".

As with wheel 118, alternative wheel embodiments 218 and 318 are, in the preferred embodiment, disposed on an imaginary, fore-and-aft centerline passing between the discs 36, 38 such that the wheel, whether wheel 218 or 318, rides within the trench formed by the discs 36, 38 during use. As before discussed, the strategic positioning of wheel 118, 218, or 318 along the vertical axes (shown in FIG. 14 for the embodiment incorporating wheel 318) is achieved by virtue of the joggled nature of the downturned length 112 near section 110 mounting arm 94.

Operation

As the drill 10 advances and the discs 36, 38 prepare a seed receiving trench in the soil, the seeds are dropped into the trench through the drop tube 48 and are immediately engaged by the firming wheel 118, 218, or 318 if the smooth wheel version is utilized. Regardless of which of the wheels 118, 218, or 318 is selected for use, the gentle, seed firming action is the same in either case.

Using the wheel 118 for purposes of illustration, it will be appreciated that the wheel 118 does not bear the weight of the opener 30 or in any way detract from the full functional effect of the gauging press wheel 50. Instead, because of the light-duty nature of the spring 92, the wheel 118 rides only gently over the deposited seeds and gives them a final firming touch that sets them down into the loose, moist soil at the bottom of the trench. Thus, all of the seeds are more assured of being set into the soil at precisely the same depth, which results in more uniform germination and emergence. In the event some loose soil may have slipped into the trench slightly covering the seeds before the wheel 118 comes along, such soft will simply be firmly covered over the seeds such that the seeds are still gently tucked down into the seed bed at the proper depth.

Figure 6:
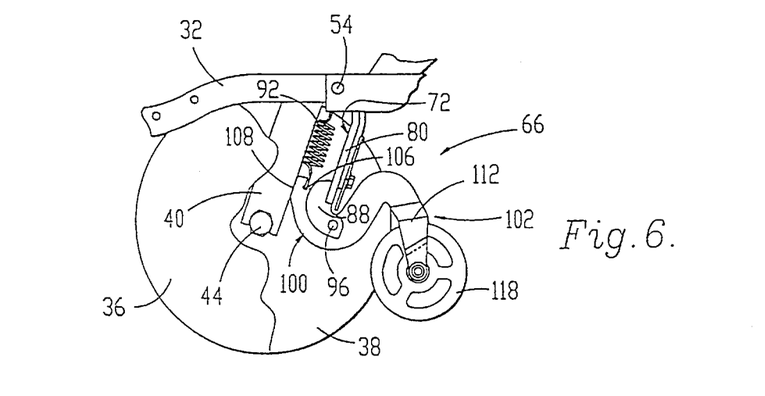
FIG. 6 is a fragmentary side elevational view similar to FIG. 5, but illustrating the firming wheel swung upwardly against the action of its biasing means to the limit of its upswinging travel.

As illustrated, for example, in FIG. 2, the firming wheel 118 is normally set to project down slightly below the bottom extremity of the opener discs 36,38. However, under actual running conditions, the arm 94 will be swung upwardly to a slight extent so that the firming wheel 118 is no deeper than the discs 36,38 and the spring 92 provides an appropriate amount of down pressure to the wheel 118 as it rolls in the trench. In the event a large obstacle is encountered by the wheel 18, the arm 94 can yield substantially upwardly as illustrated in FIG. 6 until the stop edge 108 abuts the bar 40, limiting such movement. As earlier described, the downward extent of movement of the firming wheel 118 is determined by the stop edge 106 as it abuts against the mounting bracket 72.

The design of the firming wheel assembly 66 is such as to minimize the collection and adherence of trash materials and mud. In this regard, having the wheel mounting portion of the arm 94 turned downwardly so that it normally extends in a generally upright attitude as exemplified by the down swept length 112 helps shed materials that would otherwise tend to accumulate in that area. Moreover, having the downturned length 112 positioned in close, intimate proximity to the rear edge of the discs 36,38 minimizes the space available for materials to become wedged between the trailing periphery of the discs 36,38 and the downturned length 112. As earlier mentioned, the slightly arcuate nature of the downturned length 112 as it conforms generally to the rear peripheries of the discs 36,38 also helps in this respect.

Also of significance is the fact that the downturned length 112 of the arm 94, with the exception of the lowermost tip portion 112d, is flared outwardly away from the proximal surface of the wheel 118. Thus, mud, soft particles, and trash residue that might tend to cling to the upwardly moving rear periphery of the wheel 118 and approach the downturned portion 112 are immediately released after passing the downturned portion 112, instead of being wedged into a more confined environment. This helps keep the wheel 118 rolling so that it does not skid and gouge along the bottom of the seed trench. The plastic nature of the wheels 118 and 218 is also helpful in that non-stick surfaces are thus provided so that the wheels more readily shed soft particles that would otherwise tend to adhere to such surfaces.

The invention embodied in wheel 318 further reduces collection and adherence of trash materials and mud to firming wheel assembly 66 because smooth, flat smooth face 318a allows trash materials and mud to flow by wheel 318 and not hang up on a fastener used to mount the wheel or to retain a bearing. In addition, seal drag is reduced because bearing assembly 320 requires only one seal since the interior faces 322a and 324a of inner and outer races 322, 324 are protected by the blind face 319a of concentric bore 319. Seal drag is further reduced because the reduced diameter of the shaft portion 328 results in smaller sealing engagement surface area.

Bearing Cap

The firming wheel attachment 410 of FIGS. 25–28 uses a wheel assembly 412 which is virtually identical to the wheel assembly 318 of FIGS. 13–24, except that the wheel assembly 412 adds a protective bearing cap 414. The cap 414 comprises a relatively thin, formed plate metal body that is generally concavo-convex in overall configuration. In this respect, the body of the cap has a substantially solid convex central portion 416 extending from the central axis 418 radially outwardly to a circular peripheral extremity 416a. At the extremity 416a, the body is provided with a continuous, downturned, circular edge 419 which is integrally joined with and depends from the convex portion 416. The convex portion 416 also has a raised, integral boss 416b disposed at the center of the convex portion and extending radially outwardly therefrom for a short distance.

The convex portion 416 is provided with a central clearance opening 420 of circular configuration. A pair of elongated slots or holes 422 and 424 are disposed on opposite sides of 420 in 180°, diametrically opposed relationship with one another. The holes 422 and 424 intersect with the clearance opening 420 and serve as part of the structure for retaining the cap 414 against rotation with the wheel 426 of wheel assembly 412 during use.

It will be seen in this respect that, during use, the cap 414 is installed on the wheel assembly 412 in overlying relationship to the beating assembly 428 of the wheel assembly 412. The interior flat face of the boss 416b butts up against the outer end of the inner race spindle 430 with the opening 420 in axial registration with the threaded bore 432 of spindle 430. A mounting screw 434 passes through the mounting arm 436, through the opening 420, and into the threaded bore 432 to draw the cap 414 and spindle 430 tightly up against the mounting member 436. A star washer 438 or other suitable washer may be provided between the head of the screw 434 and the member 436 to assist in maintaining the screw 434 securely received within the threaded bore 432. Thus, the bearing assembly 428 (including the spindle 430) and the screw 434 serve as structure for rotatably attaching the wheel assembly 412 to the support member 436, it being appreciated that the spindle 430 serves the dual purpose of an inner race of the bearing assembly 428 and a supporting extension of the arm 436 when the wheel assembly 412 is fully installed.

The roll pin 440 of spindle 430 is received in one or the other of the two holes 422 and 424 to assist in preventing rotation of the cap 414. In the illustrated embodiment the roll pin 440 is received within hole 424, but in the event the lower half of the cap 414 becomes worn through contact with the abrasive residue and dirt, the screw 434 may be loosened sufficiently as to permit the cap 414 to be lifted off the roll pin 440 and turned 180° to align the pin 440 with the hole 422. Retightening the screw 434 will then draw the pin into the hole 422 and present the relatively unworn upper half of the cap to be presented to the walls of the seed trench during use.

In slight contrast to the wheel 318 of the previous embodiment, the wheel 426 of firming wheel attachment 410 has a circular groove 442 or other suitable depression in the inside face 426a of wheel 426 for receiving the edge 419 of the cap 414. The groove 442 is wide enough to freely receive the edge 419 without interference therewith so as to preclude binding contact between the cap 414 and the wheel 426 during rotation of the latter. In its preferred form, the groove 442 is deep enough to receive most of the edge 419 such that the circular extremity 416a comprising the transitional intersection between convex portion 416 and edge 419 is generally flush with the wheel surface 26a. This helps prevent wrapping of trash materials and mud build-up, while encouraging the exposed, convex portion 416 of the cap 414 to shed the materials.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In an opener having a seed firming wheel assembly for pressing seeds into the bottom of a trench formed by the opener, the improvement comprising:

a support member;

a firming wheel;

structure rotatably attaching the wheel to the member for rotation of the wheel as it moves through the trench, said structure including a bearing assembly and a retainer for retaining the bearing assembly to the firming wheel, said retainer being fixed to the wheel for rotational movement therewith; and a cap covering said bearing assembly and said retainer, and disposed between the wheel and the member for protecting the assembly, said support member being operable to hold the cap against rotation with the wheel.

2. In an opener as claimed in claim 1, said wheel having an inside surface facing toward said member, said inside surface having a circular groove disposed concentrically about the axis of rotation of the wheel, said cap having a downturned, circular edge received within said groove during rotation of the wheel relative to the cap.

3. In an opener as claimed in claim 2, said cap having a central opening, said structure including a spindle comprising an inner race of said bearing assembly for rotatably supporting said wheel, a threaded, axially extending bore in said spindle aligned with said opening, and a bolt on said member passing through said opening and threadably received by said bore for securing the cap and the spindle to the member.

4. In an opener as claimed in claim 3, said spindle and said cap having means for preventing rotation thereof with the wheel.

5. In an opener as claimed in claim 4, said rotation preventing means comprising a projection extending from the spindle through the cap and into the member.

6. In an opener as claimed in claim 1, said cap having a central opening, said structure including a spindle comprising an inner race of said bearing assembly for rotatably supporting said wheel, a threaded, axially extending bore in said spindle aligned with said opening, and a bolt on said member passing through said opening and threadably received by said bore for securing the cap and the spindle to the member.

7. In an opener as claimed in claim 6, said spindle and said cap having means for preventing rotation thereof with the wheel.

8. In an opener as claimed in claim 7, said rotation preventing means comprising a projection extending from the spindle through the cap and into the member.

9. In an opener having a seed firming wheel assembly for pressing seeds into the bottom of a trench formed by the opener, the improvement comprising:

a support member;

a firming wheel;

structure rotatably attaching the wheel to the member for rotation of the wheel as it moves through the trench, said structure including a bearing assembly; and a cap covering said bearing assembly and disposed between the wheel and the member for protecting the assembly, said member being operable to hold the cap against rotation with the wheel, said wheel having an inside surface facing toward said member, said inside surface having a circular groove disposed concentrically about the axis of rotation of the wheel, said cap having a downturned, circular edge received within said groove during rotation of the wheel relative to the cap, said cap having a central opening, said structure including a spindle comprising an inner race of said bearing assembly for rotatably supporting said wheel, a threaded, axially extending bore in said spindle aligned with said opening, and a bolt on said member passing through said opening and threadably received by said bore for securing the cap and the spindle to the member, said spindle and said cap having means for preventing rotation thereof with the wheel, said rotation preventing means comprising a projection extending from the spindle through the cap and into the member, said cap having a pair of clearance holes for the projection, said clearance holes being disposed on opposite sides of said opening in diametrically opposed relationship with one another so that the cap may be selectively rotated 180° to bring either of said holes into registration with the projection for receiving the same.

10. In an opener as claimed in claim 9, said clearance holes intersecting with said opening.

11. In an opener having a seed firming wheel assembly for pressing seeds into the bottom of a trench formed by the opener, the improvement comprising:

a support member;

a firming wheel;

structure rotatably attaching the wheel to the member for rotation of the wheel as it moves through the trench, said structure including a bearing assembly; and a cap covering said bearing assembly and disposed between the wheel and the member for protecting the assembly, said cap having a central opening, said structure including a spindle comprising an inner race of said bearing assembly for rotatably supporting said wheel, a threaded, axially extending bore in said spindle aligned with said opening, and a bolt on said member passing through said opening and threadably received by said bore for securing the cap and the spindle to the member, said spindle and said cap having means for preventing rotation thereof with the wheel, said rotation preventing means comprising a projection extending from the spindle through the cap and into the member, said cap having a pair of clearance holes for the projection, said clearance holes being disposed on opposite sides of said opening in diametrically opposed relationship with one another so that the cap may be selectively rotated 180° to bring either of said holes into registration with the projection for receiving the same.

12. In an opener as claimed in claim 11, said clearance holes intersecting with said opening.

13. A cap for covering the bearing assembly of a seed firming wheel comprising a generally dish-shaped, relatively thin body having:

a concavo-convex central portion;

a down-turned, circular, peripheral edge integral with and depending from the radially outer extremity of said central portion; and a clearance opening within said central portion for accommodating mounting structure for the cap, said central portion of the body having an eccentrically disposed hole intersecting said opening for receiving a retaining projection.

14. A cap as claimed in claim 13, said central portion of the body having a second eccentrically disposed hole intersecting said opening in diametrically opposed relationship to the first-mentioned hole for alternatively receiving the retaining projection.

* * * * *